US005334088A

United States Patent [19]
Le-Normand et al.

[11] Patent Number: 5,334,088
[45] Date of Patent: Aug. 2, 1994

[54] APPARATUS FOR COMBING AND DECOMBING BACON

[76] Inventors: Claude P. Le-Normand, 18 Firwood Crl, Islington, Canada, M9B 2V7; Carlos D. Martinez, 27 Dixington Crl, Weston, Canada, M9P 2K3; John M. Jones, 1901 Martingrove Apt 512, Toronto, Canada, M9V 3P1

[21] Appl. No.: 59,019

[22] Filed: Apr. 23, 1993

[51] Int. Cl.$^5$ .............................................. A22C 17/02
[52] U.S. Cl. ..................................... 452/193; 452/186
[58] Field of Search .................................... 452/193, 186

[56] References Cited

U.S. PATENT DOCUMENTS

| | | | |
|---|---|---|---|
| 1,967,870 | 7/1934 | Covey | 452/193 |
| 4,172,305 | 10/1979 | Henebry et al. | 452/193 |
| 5,052,975 | 10/1991 | Handel | 452/193 |

FOREIGN PATENT DOCUMENTS

| | | | |
|---|---|---|---|
| 446367 | 12/1912 | France | 452/186 |
| 210329 | 9/1940 | Switzerland | 452/193 |

Primary Examiner—Willis Little

[57] ABSTRACT

A product hanger apparatus for hanging products such as meat products during processing through a processing chamber, the processing chamber incorporating a conveyor for conveying products through the chamber, and a controller for controlling the processing conditions within the chamber, the hanger apparatus having, support bars secured to the conveyor at spaced intervals, to span the width within the processing chamber, the support bars defining a pre-determined length having two ends, product hangers defining a pre-determined length having first and second ends, attachment means on said product hangers, so that they may be connected to the support bars at either end, and, a plurality of spaced apart needle members extending from the product hangers normal thereto, whereby individual pieces of product may be engaged by the needle members, and the hangers may be suspended from the support bars within the processing chamber, with the products spaced apart from one another side-by-side along the hangers.

5 Claims, 9 Drawing Sheets

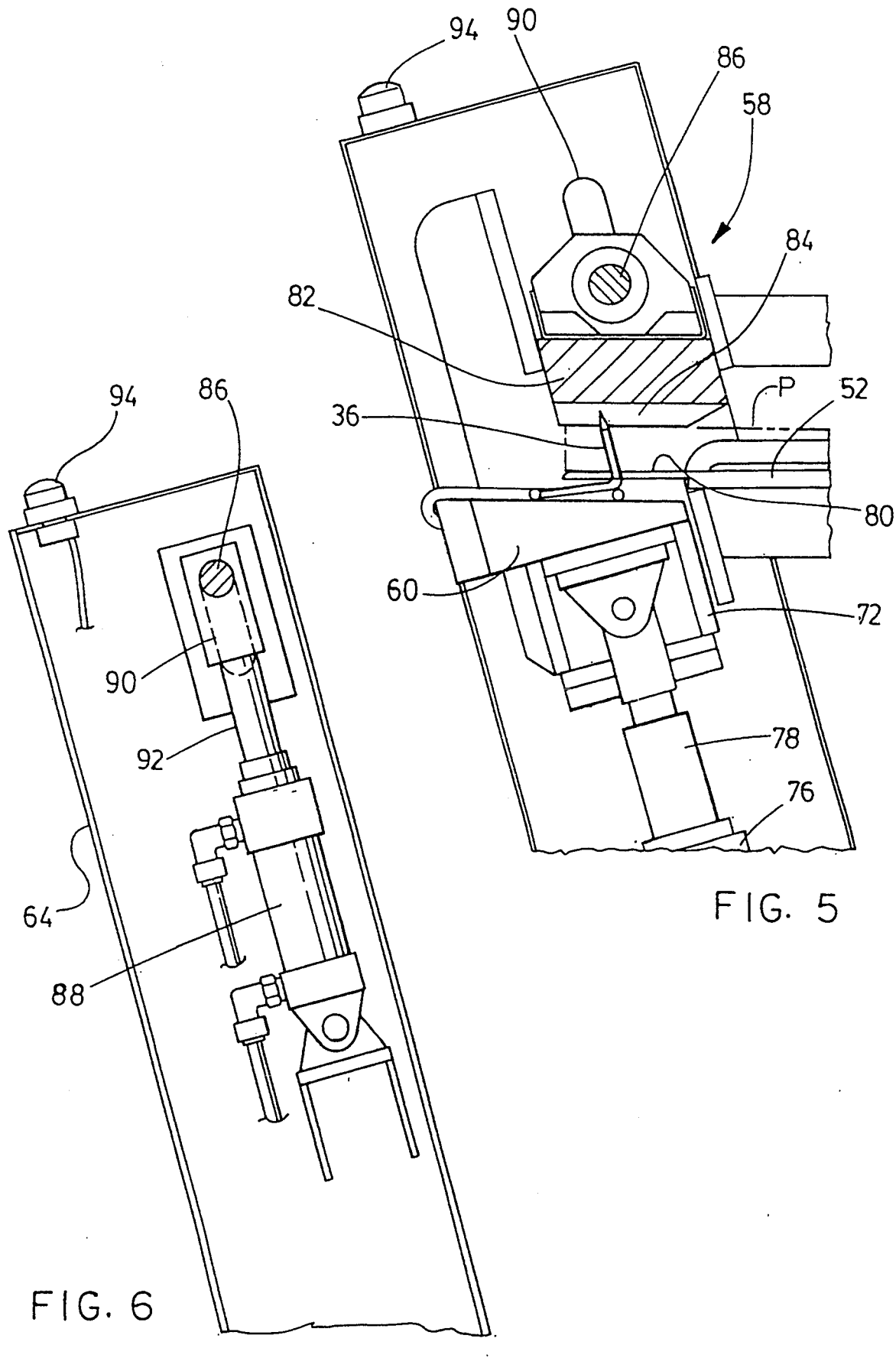

APPARATUS FOR COMBING AND DECOMBING BACON

FIELD OF THE INVENTION

The invention relates to a product hanger apparatus for hanging a product during processing through a processing facility, and in particular to a hanger apparatus designed for hanging a meat product such as pork bellies during processing into bacon, and to apparatus for removing such meat products from such product hangers.

BACKGROUND OF THE INVENTION

The processing of many products particularly meat products requires that they be transported or conveyed through one or more processing chambers or zones in which chambers or zones they are processed in various ways such as by cooking, smoking, curing, chilling and the like. Some form of support apparatus must be provided for supporting the products as they are being transported through the various zones or chambers. In the particular case of meat products such as pork bellies, it has been found that the most satisfactory results are produced by hanging the pieces of pork belly from one end, so that they hang free in a vertical position. In this way, the atmosphere within each zone or chamber is free to circulate all around the product, and provide uniform processing. In the past, the hanging of such meat products has usually been carried out on devices known as "combs". These combs were somewhat like coat hangers, that it to say they consisted usually of a triangular wire frame-work having a central upper hook, by means of which the frame-work could be suspended on a conveyor, and having a series of needles projecting laterally from one side one the structure. The needles were forced through the flesh of the pork belly adjacent one end, and the support and pork belly were suspended by means of the hook from a suitable hanger bar on a conveyor for transporting through the chambers or zones. It is customary for each pork belly to be cut into two or more pieces. As a result, in a great many cases, a pork belly, which has been cut into say three pieces, must then be hung, by three separate combs—one hanging each of the three pieces, and each of the three separate combs must then be individually manually hooked onto a supporting bar, in turn carried on a conveyor, and thus transported through the processing chamber.

The reverse process must, of course, be carried out at the end of the processing line and the bellies removed from the "combs", or "decombed".

All of these combs must then be cleaned, and returned to the upstream end of the chamber or line, for use with further pork bellies. The cost of producing a suitable quantity of such combs was considerable. In addition, the repeated manual handling of the combs involved continuous possibilities for inadvertent injury, from the plurality of sharp needles on each of the combs.

In addition however, the speed at which the processing line could be run was partly dependent upon the rate at which the pork bellies could be attached to the combs, and suspended from the support bars by individual operators. This factor tended to restrict the speed of processing. Consequently, even though it is entirely practical to build a processing line in which the chambers have relatively large cross-sectional dimensions, and in which the atmosphere is re-circulated by fan system of suitable power, the actual volume of pork bellies that could be put through such a chamber was still, nonetheless restricted by the speed at which individuals could attach the pork bellies to the combs and then hang the combs. Naturally, if larger chambers could be built for operating at greater capacities, and if it were possible to attach pork bellies at a sufficiently high rate of speed and hang them on the conveyor going through larger chambers at an appropriate speed, it would be possible to greatly increase the rate of processing of such meat products and thus, correspondingly reduce the cost. In addition, Certain other advantages may be obtained by processing facilities of increased size, namely that the consistency of the processing operation could be controlled within closer tolerances, thereby insuring a more uniform product, increasing customer satisfaction and reducing wastage.

BRIEF SUMMARY OF THE INVENTION

With a view to satisfying the various conflicting objectives described above, the invention comprises product hanger apparatus for hanging products such as meat products during processing through a processing chamber means, said processing chamber means incorporating conveyor means for conveying such products through such chamber means, and means for controlling the processing conditions within said chamber means, said hanger apparatus comprising, support bars secured to said conveyor at spaced intervals, and adapted to substantially span a predetermined width within said processing chamber means, said support bars defining a pre-determined length having two ends, product hangers defining a pre-determined length having first and second ends, attachment means on said product hangers, whereby the same may be connected to said support bars at either end, and, a plurality of spaced apart needle members extending from said product hangers substantially normal thereto, whereby individual pieces of said product may be engaged by said needle members, and said hangers may be suspended from said support bars within said processing chamber, with said products spaced apart from one another side-by-side along said hangers.

The invention further comprises such a product hanger apparatus wherein the attachment means at said ends of said hangers are inter-engagable with said support bars adjacent each end thereof.

The invention further comprises such a product hanger apparatus wherein said support bars define notch means at each end thereof, and wherein said attachment means on said product hangers comprises two attachment hook members, one at each end thereof adapted to register with respective said notch means.

The invention further comprises such a product hanger apparatus wherein said product hangers comprise a generally rectangular metallic framework having upper and lower rod portions parallel to one another, and said needle members being secured thereto it at spaced intervals, and having first handle means at one end of said frame, and second handle means adjacent to the other end of said frame, and wherein said attachment means comprise upwardly extending rod portions, terminating in downwardly extending hooks, said downwardly extending hooks being located above said handle means.

The invention further comprises a product processing facility for processing product in association with such a product hanger apparatus, and including processing chamber means, a conveyor passing through said processing chamber means, a hanger loading apparatus adjacent to a hanger loading station, operable secure said products on said hangers, and a hanger unloading apparatus adjacent to a hanger unloading station for removing product from said hangers after processing.

The invention further comprises such an apparatus and wherein said product loading apparatus comprises a support table, for supporting product, a hanger support for supporting a said hanger adjacent to one end of product, first pressure means adapted to apply pressure to a surface of said product, second pressure means adapted to apply pressure to said needle member, whereby said needle members are forced through said product, said pressure means being thereafter releasable, or removal of said hanger and said product thereon.

The invention further comprises such an apparatus and further including product unloading apparatus comprising hanger holder means for holding a hanger with product supported thereon, after processing, pusher bar means for pushing said product off said needle members, and power operated means for operating the same, and conveyor means for conveying said product away from said product unloading apparatus.

The various features of novelty which characterize the invention are pointed out with particularity in the annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 5 is a section along the line 4—4, somewhat enlarged, with the table omitted, and showing the parts thereof in their clamping position;

FIG. 6 is a section along the line 6—6 of FIG. 3;

DESCRIPTION OF A SPECIFIC EMBODIMENT

Figure 1:
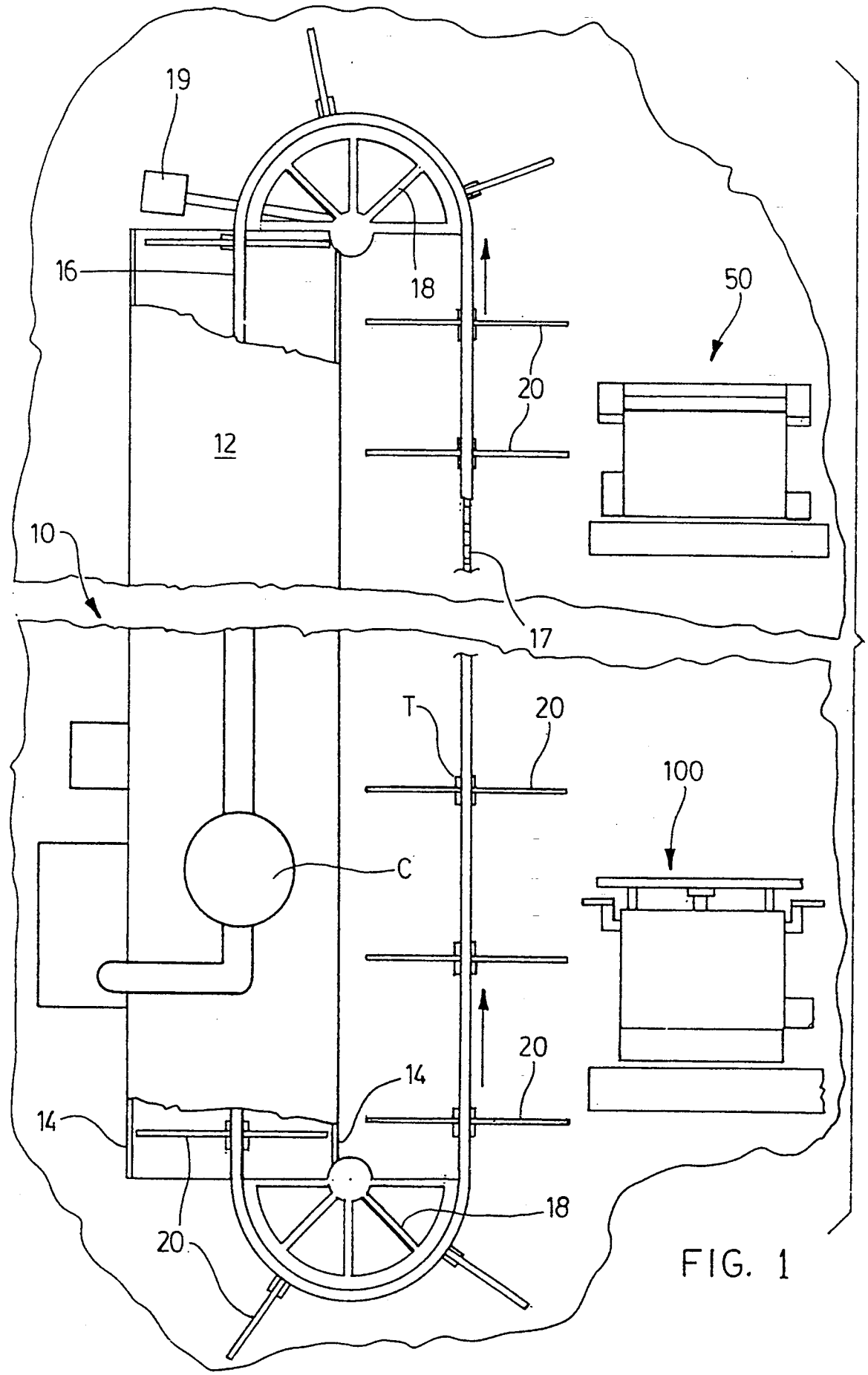
FIG. 1 is a schematic top plan illustration of a typical processing chamber facility, showing an over-head conveyor rail system, and a plurality of support bars in accordance with the invention suspended thereon.

Referring first of all to FIG. 1, it will be seen that the invention is described here in relation to a typical meat processing chamber facility, in this case, being specifically designed for the processing of pork bellies into bacon.

It will, however, be appreciated that the invention is not confined solely to the processing of bacon products but is also of wider application, and may have application to the processing of food products of other kinds or indeed, of other non-food products, Or the type which may be suspended and transported through a processing chamber facility.

The processing chamber is indicated generally as 10, and will be seen in this illustration to comprise a generally rectangular cross-section defining a top wall, 12 and side walls 14. A single conveyor system is illustrted generally as 16. It will, of course, be appreciated that the size of the walls and the dimensions of the chamber may vary widely from one design to another and from one type process to another and from one type of product to another. For example, even in the processing of bacon, it may be desirable to provide a chamber which is two or three times the width of the chamber shown in FIG. 1. This would enable the provision of two or more conveyor rail systems indicated as 16 in FIG. 1, being arranged side by side, to transport product through the chamber, thus, increasing the volume of the product being processed at any given time.

Within chamber 10, any desired processing can be carried out. The processing conditions will be established by one or more process conditioners indicated as C. In many such chambers there may be two or three separate zones each of which would have its own process conditioning. Process conditioning may be carried out by means of circulating air, heated or otherwise, and tempered with smoke or other materials, and or by water deluge, and there will usually be a chilling zone at some point, although this may be located at another location.

All of these details of such chambers are well known in the art, and the details are therefore omitted or the sake of clarity.

The conveyer system 16, in this embodiment is illustrated as an overhead conveyer rail, which is particularly convenient for this type of processing operation. It will, however, be appreciated that the invention is not exclusively limited to an overhead conveyor system, but is of more general application, and would be applicable to a variety of different conveyor systems both overhead, and based on floor mounted rails and the like, such as is well-known in the art.

For the sake of simplicity, the conveyor rail is shown as having a chain 17, running around end wheels 18, and driven by a typical motor 19. Wheels 18 are shown partially cut away for the sake of simplicity, being in any event well known in the art.

It will be appreciated that this is an entirely schematic illustration, and in practice more sophisticated facilities could be provided or many purposes.

The support devices indicated as 20, in accordance with the invention are shown secured to the conveyor 16, by means of the usual form of trollies T, which may be moved in any suitable way for example, by a chain-movement system or the like, such as has been briefly outlined above, the details of which are omitted for the sake of clarity. It will thus be seen that the support devices 20, will move through the chamber 10, one after the other in pre-determined spaced apart manner. In this way, free circulation of the atmosphere within each chamber or zone is ensured, so as to provide that all of the products are processed equally and to the same degree, so as to provide a uniform end product. It will, of course, be appreciated that while only one chamber 10, is illustrated there may be plurality of such chambers 10, one after the other, providing for different processing conditions such as cooking, smoking, curing and or the like, and eventual chilling. Alternatively, a continuous chamber 10, may be divided up into separate zones by any suitable means such as doors or the like as is well-known in the art, the details of which are omitted for the sake of clarity.

Each support device 20, will be seen in this embodiment to comprise an upper support bars 22 and 24, mounted on a single central generally upright column 24.

Support bars 22 will be seen to be in this embodiment of generally rectangular configuration in section. However, it is within the scope of the invention that they may be oval or cylindrical in shape along their length, the precise shape being a matter of choice in most cases. Adjacent each end of each support bar 22 and 24, there are provided recesses or notches 26a–26b, the purposes of which will become apparent from the following description.

In order to hang pieces of product, in this case sections of pork bellies indicated generally as P, from respective support bars 22, there are provided a plurality of product hangers 30.

It will, of course, be appreciated that in various different circumstances there may be two or more support bar suspended from each of the conveyor trollies, at spaced intervals beneath each trolley, the illustration here showing one such support bar being merely for the sake of explanation.

Each of the hangers 30 will be seen to comprise a generally rectangular framework structure having upper and lower parallel spaced apart rods 32—32, joined at each end by vertical members 34—34. Generally L-shaped needles 36—36 are secured to both rods 32, so as to provide a firm secure engagement. The needles in this particular embodiment are grouped in groups of four, there being three such groups in this case so that three separate pieces of product indicated generally as P may be supported on one hanger, with adequate spacing between the products so as to permit free circulation of air or other processing conditioning means therebetween.

Each of the vertical members 34—34 is extended upwardly above the parallel bars 32, and terminates in a downwardly directed hood 38—38. The hooks 38 are adapted to register with the notches 26a–b.

In order that a loaded hanger 30 can be manually transferred and raised onto the support bar 22, a first handle 40 is provided extending outwardly from one end of the rods 32—32. A second intermediate handle 42 is provided adjacent to the opposite ends of the rods 32 but spaced inwardly therefrom. The handle 42 is maintained clear of the bar 22, so as to avoid difficulties in manual loading.

Figure 3:
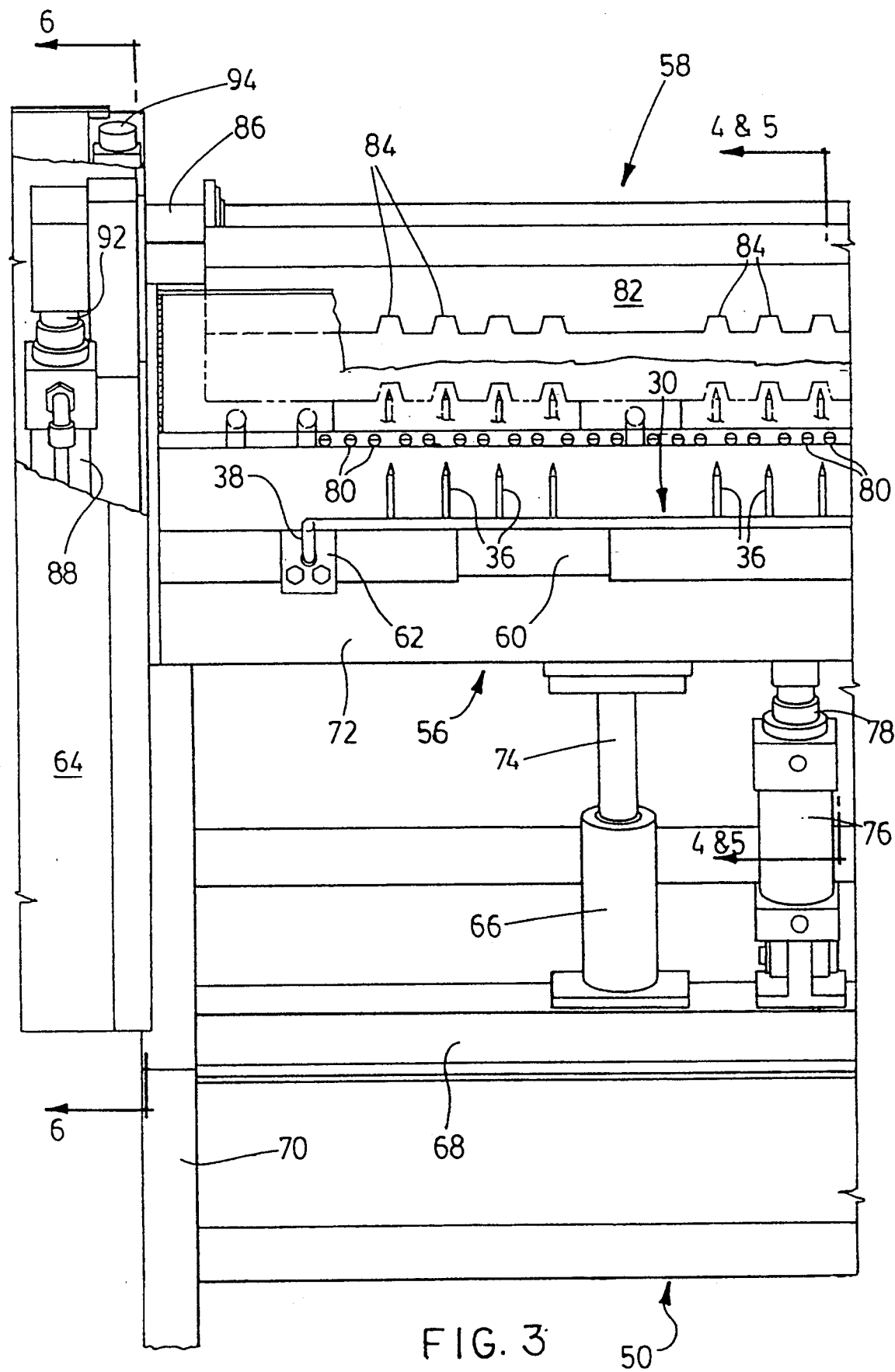
FIG. 3 is a rear elevational view of the product loading apparatus, shown partially cut away, the cut away portion being substantially a mirror image of what is shown in FIG. 3, and showing movement thereof in phantom.

Referring once again to FIG. 1, it will be seen that FIG. 1 also illustrates a product loading station indicated generally as 50. The loading station 50 is illustrated in more detail in FIGS. 3, 4, 5 and 6. As mentioned, FIG. 3 is a rear elevational; view of the loading apparatus, and is a split elevation that is to say, it shows the principle details of one side of the apparatus with the other side of the apparatus being emitted for the sake of clarity, but being otherwise essentially a mirror image of what is shown in FIG. 3, with certain exceptions described below. The loading apparatus thus comprises a loading table 52 (FIG. 4) supported st a suitable elevation on a framework and legs 54—54.

At the edge (lefthand in FIG. 4) of the table 52, there are provided a lower pusher assembly 56, and an upper pusher assembly 58.

The lower pusher assembly 56 comprises of a hanger holder bar 60. Interlocking recess plates 62 are provided on the pusher bar 60 for receiving the hooks 38 of a hanger bar 30. In this way the hanger bar 30 is held securely in position during the operations described below to force it into the product P.

The pusher bar 60 is mounted for sliding movement between side housing 64—64, only one of which is shown in FIG. 3. Its movement is guided by means of two guide sleeves 66—66 (only one of which is shown in FIG. 3). The two guide sleeves are mounted at spaced apart intervals on a cross bar 68, which is in turn supported on a portion of the framework indicated generally as 70.

Figure 4:
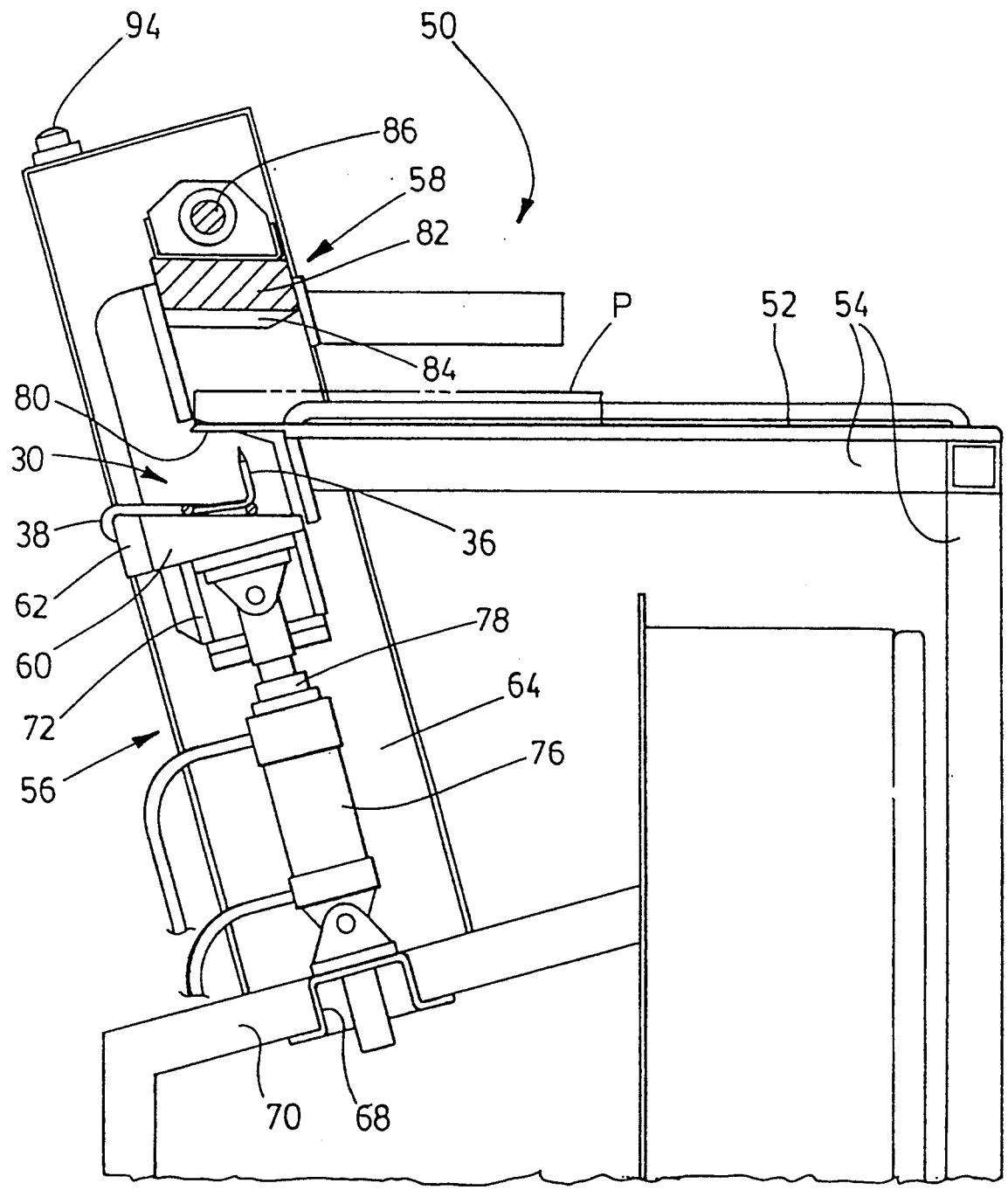
FIG. 4 is a section along the line 4—4 of FIG. 3, showing the apparatus in its opened condition, with a product item shown therein in phantom.
Figure 7:
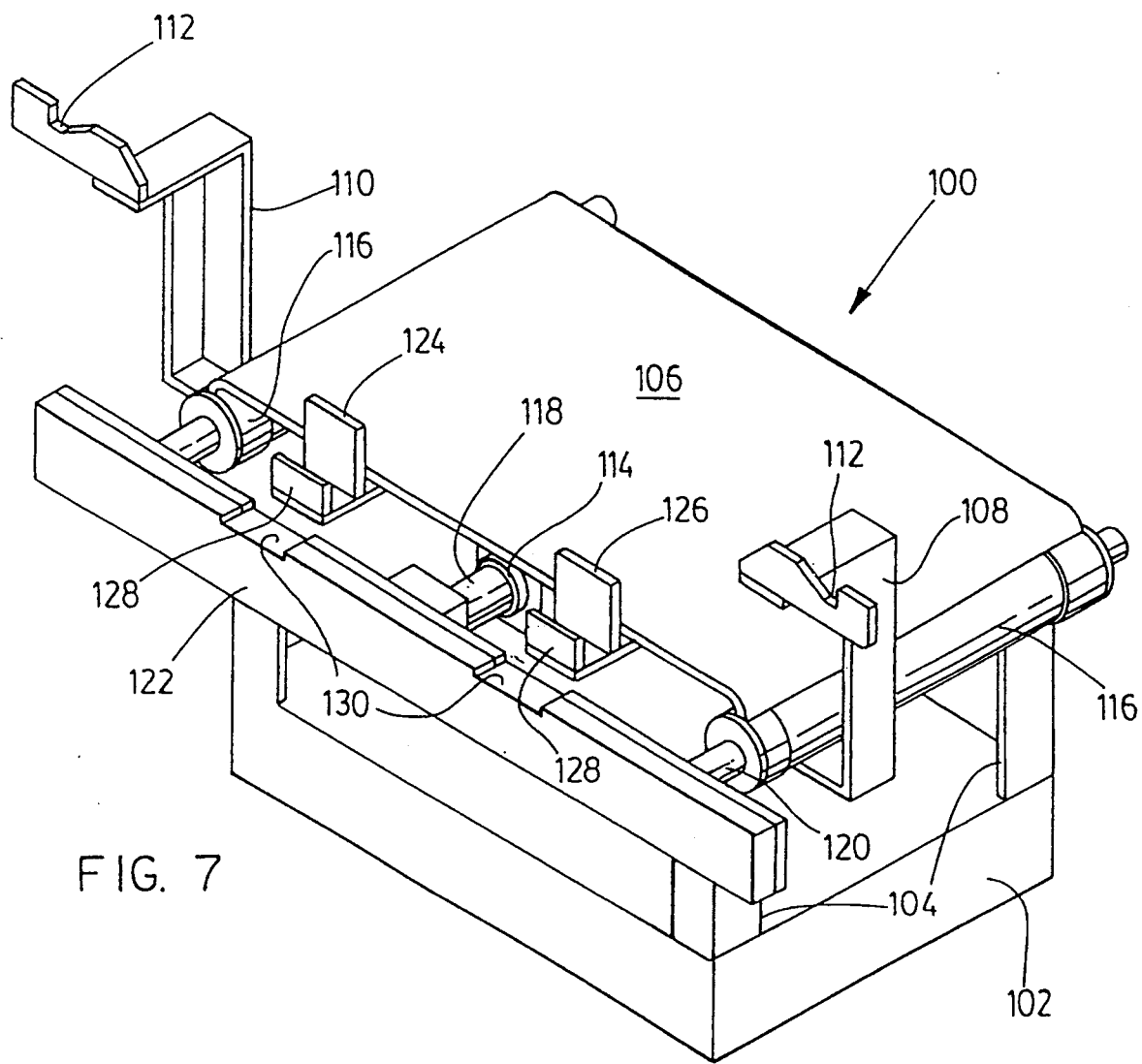
FIG. 7 is a front perspective illustration of the unloading apparatus in accordance with the invention, showing a hanger in position thereon with product shown in phantom.
Figure 8:
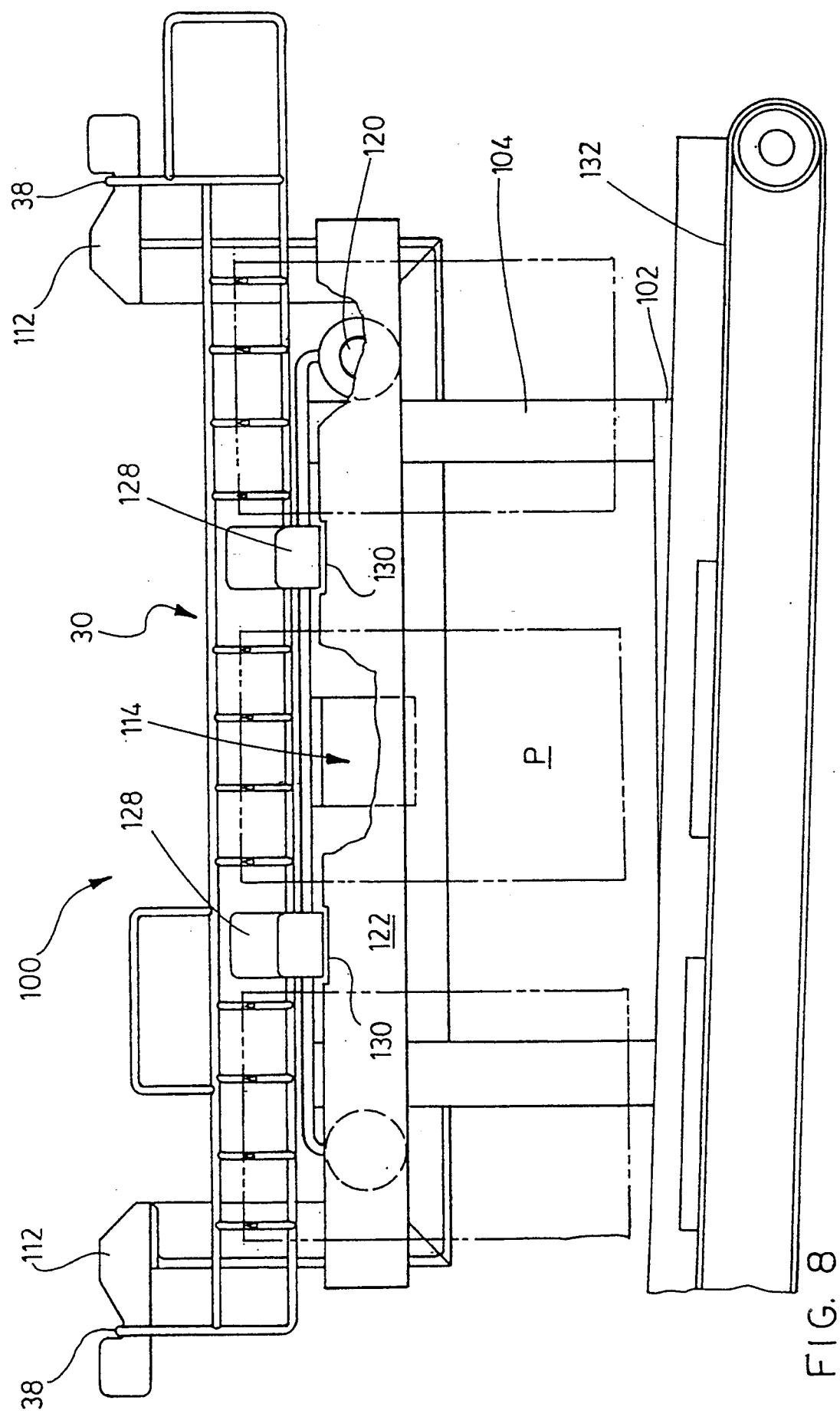
FIG. 8 is a front elevational view of the unloading apparatus shown in FIG. 7, with a hanger shown thereon and showing product in phantom and also showing the conveyor.
Figure 9:
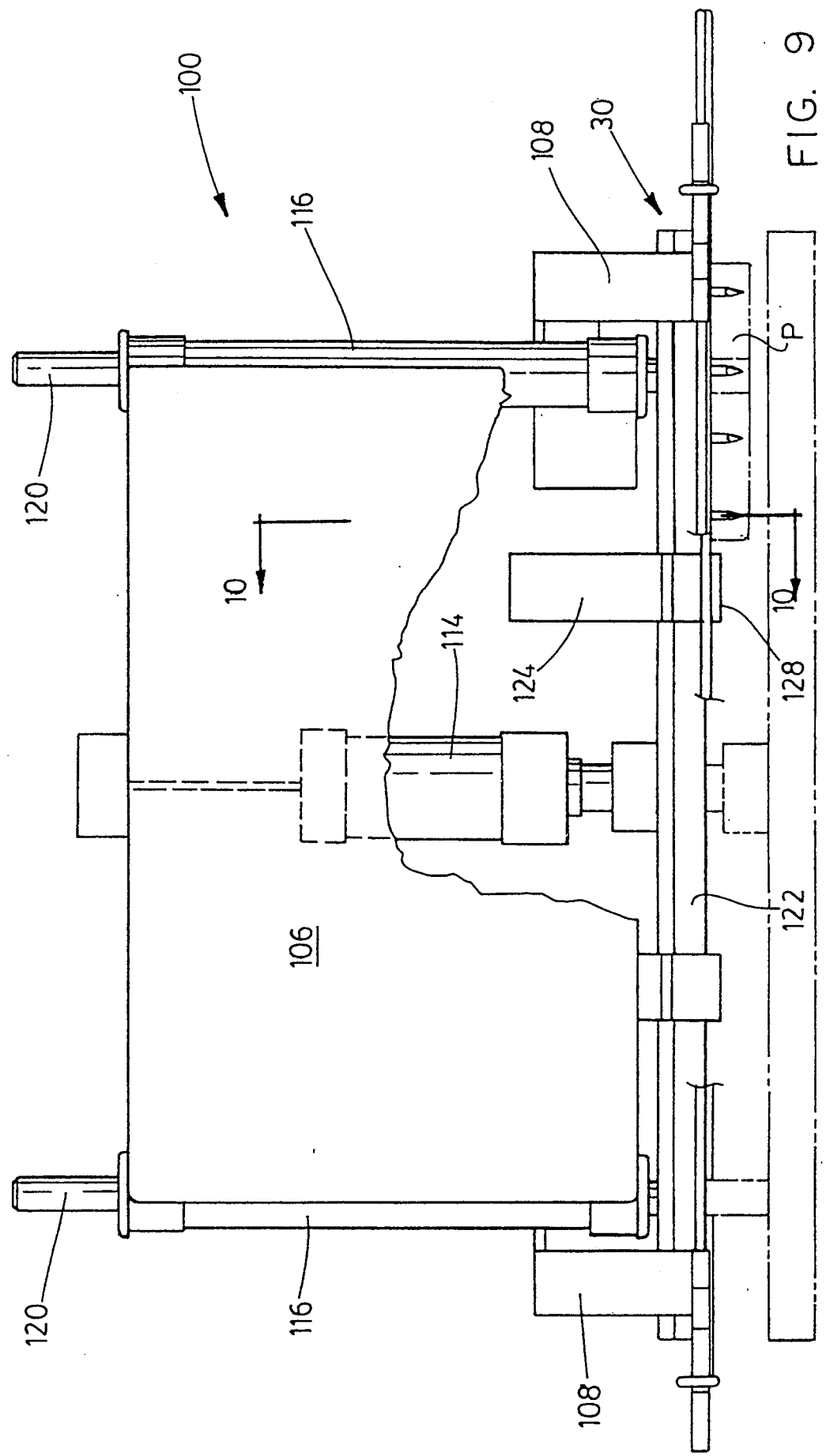
FIG. 9 is a top plan view of the unloading apparatus of FIG. 7 and 8, and showing extension of the pusher mechanism in phantom; and, FIG. 10 is a section along the line 10—10 of FIG. 9, and showing extension of the pusher mechanism in phantom, and also showing the product removal in phantom.
Figure 10:
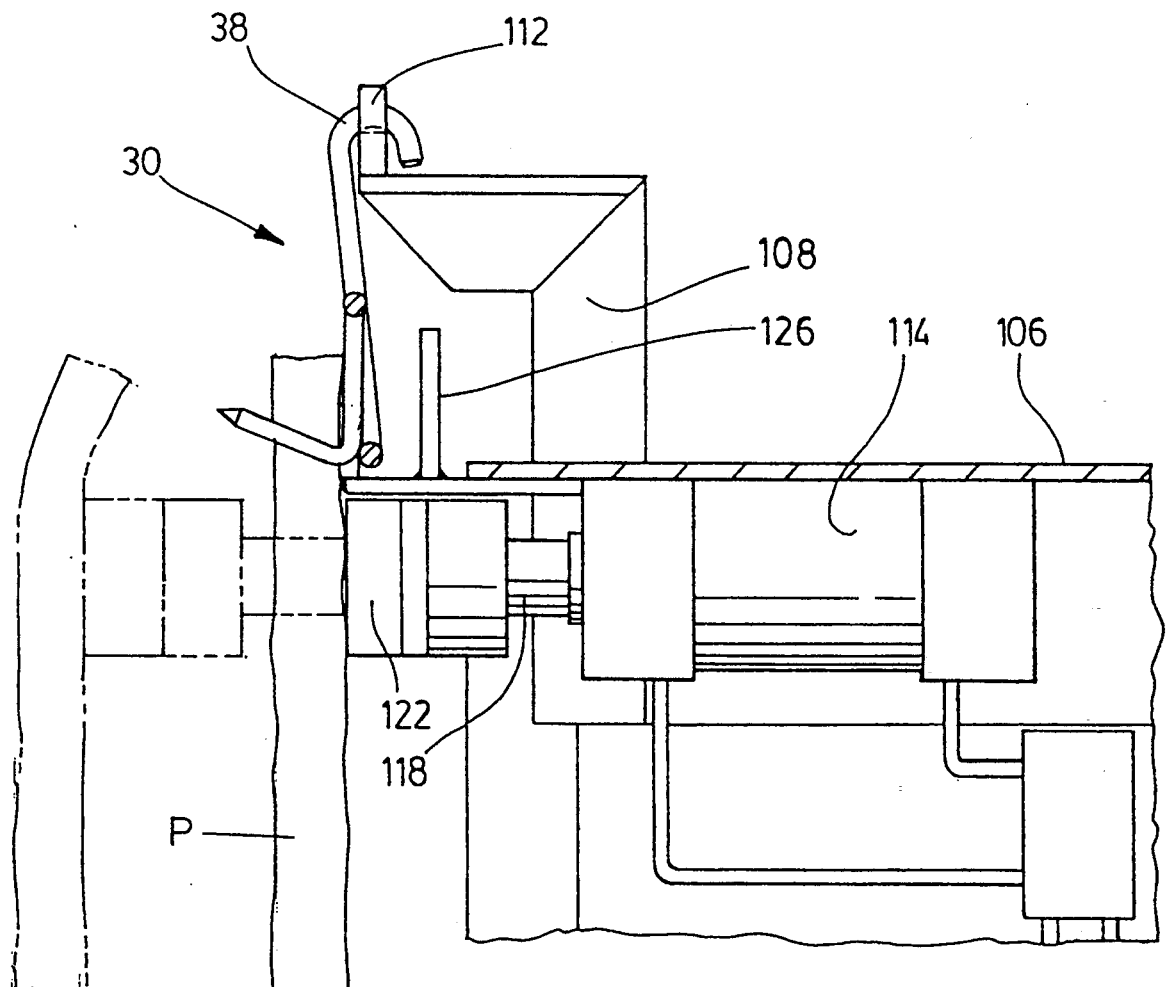

Respective guide pistons 68—68 (only one of which is shown in FIG. 3) extend from respective sleeves 66—66, and are secured to the underside of a generally rectangular housing 72, secured beneath the pusher bar 60 (see FIG. 4).

In order to reciprocate the lower pusher bar 60 upwardly and downwardly, a central power operated cylinder 76 is provided. The lower end of cylinder 76 is pivotally mounted to cross frame 68, between the two guide sleeves 66. The piston rod 78 extending from cylinder 76 is pivotally mounted within the rectangular housing 72, directly beneath the pusher bar 60 (FIG. 4).

In order to support the product P directly over the needles 36, a plurality of support rods 80 extend co-planar with the table 52, over the location of the needles 36 (FIG. 4).

However, as will be noted from FIG. 3, the rods 80 are spaced apart in such a way that the needles 36 are capable of passing between them so as to be forced through the product.

In order to achieve satisfactory rapid penetration of a product P, which is essentially flexible, such as a pork belly, it is also necessary that a further clamping effect be applied on the upperside of the product.

This further clamping effect is achieved by the upper clamping mechanism 58.

As best shown in FIG. 5, the upper clamping mechanism 58 comprises an upper pressure bar 82 extending from side to side of the side housings 64. The bar 82 is formed with series of slots 84 adapted to register with the needles 36 for reasons to be described below.

The bar is connected at each end, by bearing pins 86, to respective operating cylinders 88—88 in each of the housings 64 (only one of which is shown in FIG. 3).

Slots 90 (FIG. 5) are formed in respective housings 64—64, and permit the respective bearing shafts 86 to pass through into the interior of respective housings 64.

As best shown in FIG. 6, each of the side housings 64 contains an operating cylinder 88, connected to a respective bearing shaft 86. In this way, by simultaneous operation the two cylinders 88, the upper pressure bar 82 can be reciprocated towards the lower pressure bar 60. Piston rods 92 extend from respective cylinders 88 and are connected to respective bearing shafts 86.

While all of the power sources, valves and the like, are omitted for the sake of clarity, it should be noted that there are two operating buttons 94—94 (only one of which is shown in FIG. 3) mounted on respective side housings 64. The provision of two operating buttons, which are so connected that operation of one button will not cause the machine to operate, but operation of both buttons simultaneously does cause the machine to operate, provides a measure of safety, since the operator must use both hands with his arms spread apart to reach the two buttons.

The operation of the two buttons will cause initially a downstroke of the upper pressure bar 82 until it firmly engages the upper surface of the product P. The lower bar 64 is then forced upwardly (FIG. 5) causing the needles to pierce the product P.

Figure 2:
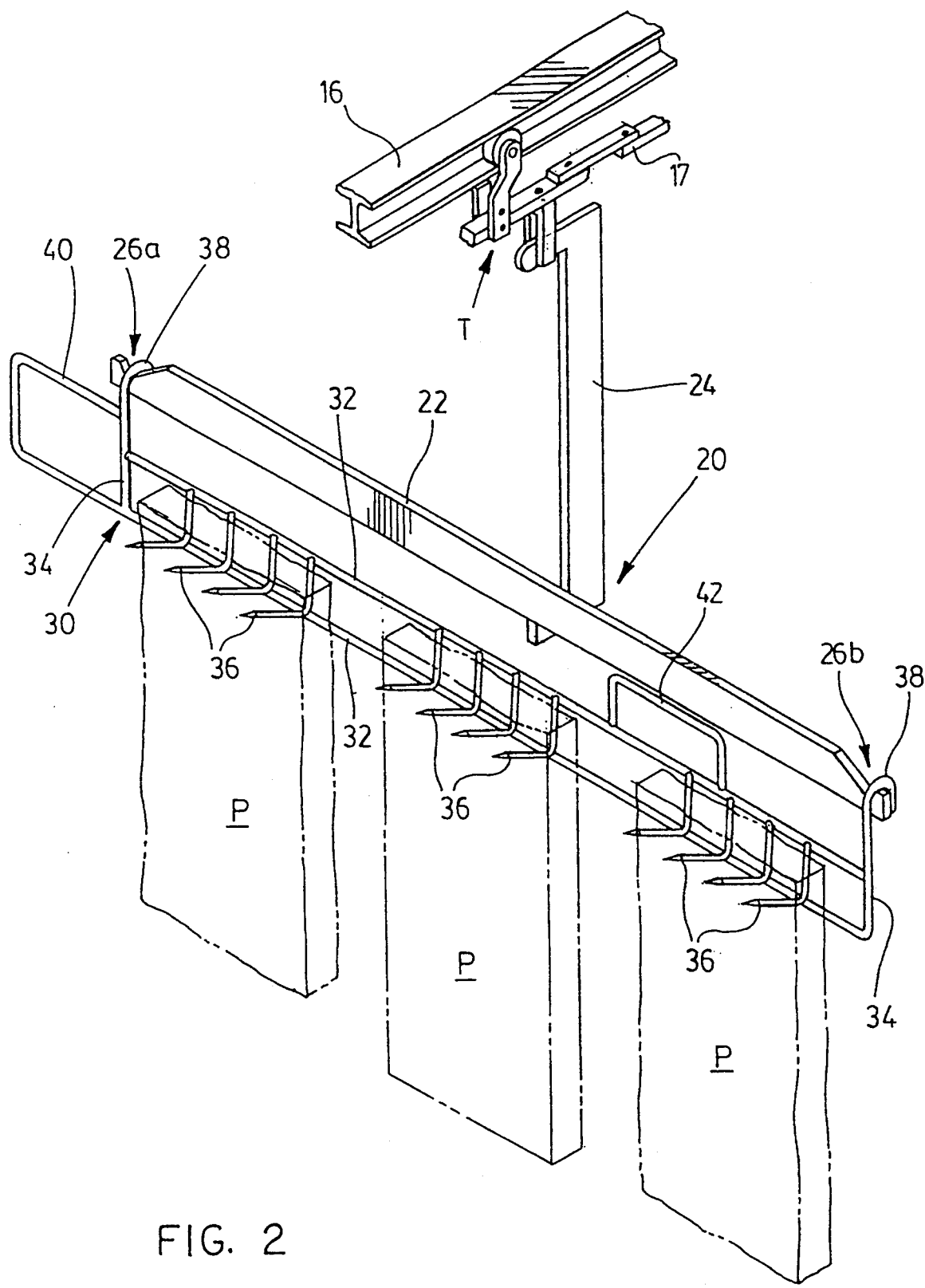
FIG. 2 is an enlarged perspective illustration of a support bar, and a hanger, and needles extending therefrom with product shown in phantom thereon.

By a suitable timing mechanism (not shown) the operation of the upper pressure bar 82 and the lower bar 60 then cause them to reciprocate away from the product P. The operator can then simply grasp the handles 40 and 42 (FIG. 2) and left the entire carrier, together with its three pieces of product P, and place it in position on the support bar 22 (FIG. 2) on the conveyor.

Referring once again to FIG. 1, the unloading station is shown illustrated generally as 100. It is shown in more detail in FIGS. 7, 8, 9 and 10. The purpose of the unloading station, is to enable an operator to unload the carriers carrying processed product, in a speedy, efficient manner.

For this purpose, the unloader or so called "decomber" comprises an essentially rectangular framework defining a base 102 and legs 104, supporting an upper plate member 106. Secured beneath the plate member 106 are two carrier holder arms 108 and 110 having notched plates 112 extending therefrom. The notched plates 112 are spaced apart an appropriate distance to receive the hooks 38 of a carrier 30 (as shown in phantom).

Also located beneath the table 106, there is a purality a power cylinder 114 located more or less along the central axis of the table 106. Additionally, there are two linear bearing members 116—116 on either side of the power cylinder 114. The power cylinder 114 has a piston rod 118. The linear bearings have bearing rods 120.

A transverse pusher bar 122 is secured to the piston rod 118 and the bearing rods 120. Operation of the cylinder 114 will therefore extend and retract the pusher bar, and also the linear bearing rods 120—120.

Also secured beneath the table 106, are a pair of carrier holders 124 and 126. Each of the carrier holders define a front retaining flange 128—128, adapted to engage the carrier 30.

It will be noted that the holders 124 and 126 are spaced apart a distance so that they fit between the spacing between the groups of needles on the carrier, and thus will not interfere with the three products P hanging from the needles.

The operation of the device is self-evident from the description given.

With the pusher bar 122 retracted (FIG. 9) a carrier 30 loaded with product P is placed with its hooks on the notched plates 112. The carrier 30 will be received in the carrier holders 124 and 126 and will be held against flexing movement by the flanges 128.

The product P will then thus be hanging downwardly in front of the pusher bar 122.

The pusher bar 122 is notched at 130 so as to be capable of sliding movement beneath the carrier holders 124-126 passing the loaded carriers through a processing facility to process the product and then automatically unloading the product from the carriers at an unloading station.

Beneath the pusher bar 122, there is located a conveyor 132, moving in this case transversely so as to collect the products P as they are released from the needles, and then dropped down onto the conveyor. The conveyor then conveys the processed products P to another location.

It will thus be apparent that the entire system may be operated at a higher production rate than a conventional manual system, and at the same time there is less risk of injury from needles, and less physical strain, and in fact, less labour is required to staff the system.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A product processing facility for processing product in association with product hanger apparatus, and comprising:

processing chamber means;

support bars secured to said conveyor at spaced intervals, and adapted to substantially span a predetermined width within said processing chamber means, said support bars defining a pre-determined length having two ends;

product hangers defining a predetermined length having first and second ends;

attachment means on said product hanger, whereby the same may be connected to said support bars at either end;

a plurality of spaced apart needle members extending from said product hangers substantially normal thereto, whereby individual pieces of said product may be engaged by said needle members, and said hangers may be suspended from said support bars within said processing chamber, with said products spaced apart from one another side-by-side along said hangers;

a support table for supporting product;

a hanger support for supporting a said hanger adjacent to one end of product;

first pressure means adapted to apply pressure to a surface of said product, and second pressure means adapted to apply pressure to said needle members, whereby said needle members are forced through said product, said pressure means being thereafter releasable, for removal of said hanger and said product thereon.

2. A product processing facility as claimed in claim 1 wherein the attachment means at said ends of said hangers are inter-engagable with said support bars adjacent each end thereof.

3. A product processing facility as claimed in claim 1 wherein said support bars define notch means at each end thereof, and wherein said attachment means on said product hangers comprises two attachment hook members, one at each end thereof adapted to register with respective said notch means.

4. A product processing facility as claimed in claim 1 wherein said product hangers comprise a generally rectangular metallic framework having upper and lower rod portions parallels to one another, and said needle members being secured thereto it at spaced intervals, and having first handle means at one end of said frame, and second handle means adjacent to the other end of said frame, and wherein said attachment means comprise upwardly extending rod portions, terminating in downwardly extending hooks, said downwardly extending hooks being located above said handle means.

5. A product processing facility as claimed in claim 1 further including product unloading apparatus comprising hanger holder means for holding a hanger with product supported thereon, after processing, pusher bar means for pushing said product off said needle members, and power operated means for operating the same, and conveyor means for conveying said product away from said product unloading apparatus.

* * * * *